Feb. 17, 1931. W. D. MELTZER 1,792,857
CORN TURNER ADJUSTING MEANS
Filed Jan. 23, 1930
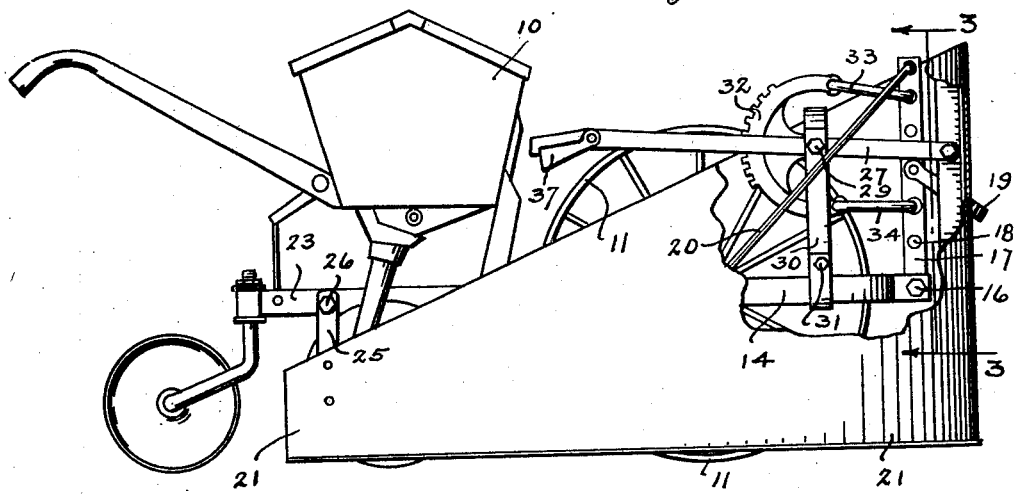
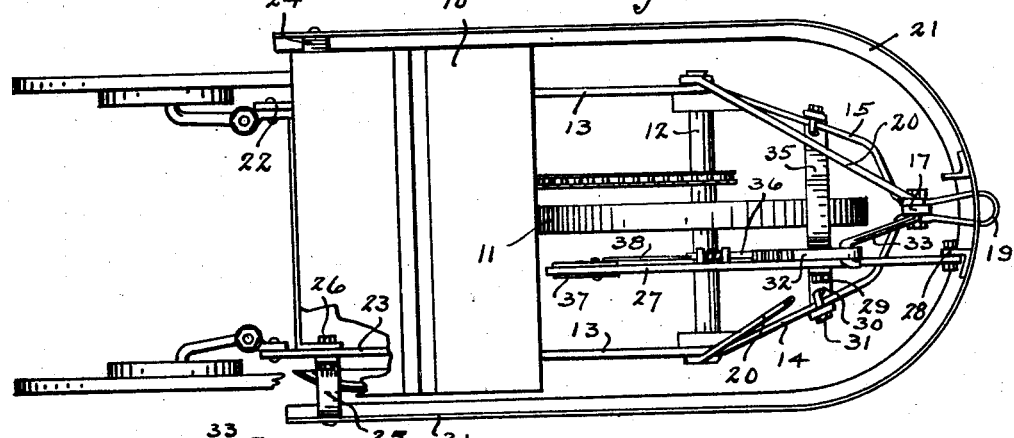
INVENTOR,
Walter D. Meltzer,
By Minturn & Minturn,
Attorneys.

Patented Feb. 17, 1931

1,792,857

UNITED STATES PATENT OFFICE

WALTER D. MELTZER, OF NEAR SHELBYVILLE, INDIANA

CORN-TURNER ADJUSTING MEANS

Application filed January 23, 1930. Serial No. 422,742.

This invention relates to the art of grain drills and particularly to an attachment to be applied to drills to permit adjustment of means for turning aside corn stalks from the path of the drills.

Means for turning corn stalks to leave a clear path for a grain drill are well known to those versed in the art. Such means however, have always, heretofore, been applied to drills in a fixed position. The soil will vary in firmness from one point to another in any field with the result that in loose soils the drill will sink deeper and cause the turning means to drag into the soil. On harder soils the drill will ride higher and cause the turner to be carried at a distance from the soil that would permit corn stalks lying on the ground to pass thereunder without being turned aside.

My invention overcomes the difficulties encountered by a fixed corn turner by providing parts that may be applied to a drill for a corn turner without having to alter any of the drill or turner parts and that permit the raising and lowering of the front nose of the turner while the drill is in motion so as to adjust the turner as may be required upon meeting the varying types of soil across a field.

These and other objects will become apparent in the following description of the invention as illustrated in one particular form in the accompanying drawing, in which—

Fig. 1, is a side elevation of a grain drill to which my invention is applied;
Fig. 2, a top plan view; and Fig. 3, a fragmentary vertical section on the line 3—3 in Fig. 1.

Like characters of reference indicate like parts throughout the several views in the drawing.

The grain drill 10 has the customary ground wheel 11 on the axle 12 which carries the frame 13. Members 14 and 15 are carried forwardly from the frame 13 and around in front of the wheel 11 and have their front ends brought together to secure therebetween by the bolt 16 the vertical hitch bar 17. The bar 17 is provided in the customary manner with a plurality of holes 18 therealong as a means for adjustably locating a clevis 19 thereon. The bar 17 is maintained in a vertical position by means of the brace rod 20 extending from one side of the frame 13 to the upper end of the bar 17 and thence downwardly and rearwardly to the other side of the frame 13.

A corn turner 21 of the usual type is shown consisting of a sheet metal shield passing entirely around the front end of the drill ahead of the bar 17 with wings extending rearwardly on each side of the drill. The rear end of the turner is supported from the adjustable frame members 22 and 23 by means of the brackets 24 and 25 which are fixed to the ends of the wings of the turner and pivotally secured to the frame 22 and 23 by bolts 26 whereby the front end of the turner may be raised and lowered about the bolts 26 as pivots.

Instead of securing the front end of the turner in a rigid manner to the bar 17, I provide a lever 27 which has its front end pivotally secured to the front end of the turner, here shown as to a vertically disposed angle bar 28. The lever 27 is fulcrumed on a bolt 29 which is passed through the upper end of the leg 30, which leg has its lower end secured to the rail 14 in an adjustable manner by the bolt 31. On the same bolt 29 is rockably carried a sector 32 which is held against rotation by the links 33 and 34.

These links 33 and 34 are hooked in respective ends of the sector 32 and are passed by their forward ends through suitably located holes 18 in the bar 17 and secured by nuts being screw-threadedly carried on the ends projecting through the bar 17.

The leg 30 is further supported by the arm 35 which has its lower end removably secured to the rail 15 and its upper end arched around and over the wheel 11 to be turned downwardly to bear against the sector 32 and receive therethrough the bolt 29.

The lever 27 extends rearwardly from the bolt 29 to have its rear end within reach of the drill operator and carries thereon the dog 36 adapted to engage between the teeth of the sector 32 as the lever 27 may be rocked therearound. The dog 36 is controlled in the usual and well known manner by the finger grip member 37 having a rod 38 extending therefrom to the dog.

It is thus to be seen that I have provided a structure which may be quickly and easily attached to a grain drill that will permit the raising and lowering of the front end of a corn turner by the simple rocking of a control lever. Pushing down on the lever 27 at the rear end will cause the nose of the turner to be raised and that position will be maintained by the dog 36 engaging between the teeth at the corresponding point on the sector 32. The reverse action of course will permit lowering of the nose of the turner.

While I have here shown and described my invention as applied in one particular form to a specific type of grain drills, it is entirely obvious that structural changes may be made in that form to meet varying conditions of grain drills and turners without departing from the spirit of the invention, and I therefore do not desire to be limited to that precise form nor any more than may be required by the following claims.

I claim:

1. In combination with a grain drill and a corn turner rockably carried on the drill, a turner adjusting means comprising a bracket, a lever pivotally supported by the bracket, and connected to the turner, and means for holding the lever at selective positions of rotation about the bracket.

2. In combination with a grain drill and a corn turner, a turner adjusting means comprising a bracket to be secured to the drill, a lever rockably supported by the bracket, sector means carried by the bracket, the front end of the lever being pivotally connected to the turner, and said turner being rockably secured to the drill.

3. In combination with a grain drill having a frame and a hitch bar and a corn turner rockably supported by the drill, of a turner adjusting means comprising a lever, a bracket secured to the drill frame rockably supporting the lever, means locating and holding the upper end of the bracket at a fixed distance from the hitch bar, and means for holding the lever at selective positions of rotation about the bracket, said lever being pivotally connected to the turner.

4. For a grain drill and corn turner, a removable bracket, a lever rockably supported on the bracket, a sector on the bracket, and links for holding the sector in selective rotated positions on the bracket.

5. For a grain drill and corn turner, a removable bracket, a lever rockably supported on the bracket, a sector on the bracket, and links for holding the sector in selective rotated positions on the bracket, said bracket being in two pieces and having said lever and said sector pivotally secured between the upper ends of the pieces.

In testimony whereof I affix my signature.

WALTER D. MELTZER.